Oct. 11, 1966   W. W. WEISPFENNING   3,277,967
YIELDABLE DRAFT CONNECTION
Filed Aug. 12, 1964

INVENTOR.
WALTER W. WEISPFENNING
BY
Williamson & Palmatier
ATTORNEYS

United States Patent Office

3,277,967
Patented Oct. 11, 1966

3,277,967
YIELDABLE DRAFT CONNECTION
Walter W. Weispfenning, Cooperstown, N. Dak., assignor to Reiten Manufacturing Company, Cooperstown, N. Dak., a corporation of North Dakota
Filed Aug. 12, 1964, Ser. No. 389,154
6 Claims. (Cl. 172—705)

This invention relates to draft connections for agricultural implements and more specifically to a yieldable draft connection.

An object of this invention is the provision of a novel and improved yieldable draft connection for an agricultural implement, such as a plow, including an implement beam supported for vertical swinging movement in response to a predetermined draft load, as when the implement engages an obstruction, the yieldable means being provided which constantly urge the implement to its lowered operative position.

A more specific object of this invention is to provide a yieldable draft connection for a plow and which includes a draft beam mounted upon supporting means including a cam element, and being vertically swingable in response to a predetermined draft load, the beam having a continuously curved cam surface defined at least in part by an arc of an ellipse, and engaging the camming element during swinging movement of the beam for quickly tensioning the yieldable tensioning means connected to the beam whereby the force exerted on the beam by the tensioning means during return of the beam to its original position will be sufficient to cause the implement to penetrate the ground, and obviate the necessity of backing up or raising the plow beam to an elevated position to reset the plow.

A further object of this invention is to provide a novel and improved plow beam structure including a yieldable beam normally urged by yieldable tensioning means to an operative position upon a pair of supporting elements, one of which is a cam, the tensioning means including upwardly and forwardly inclined springs which cooperate with the cam and cam surface to exert a wedge or inclined plane effect upon the plow beam during any vertical displacement of the plow beam so that the implement will be positively returned to its lowered operative position not withstanding the amount of displacement of the beam.

These and other objects and advantages of the invention will more fully appear from the following description made in connection with the accompanying drawings, wherein like character references refer to the same or similar parts throughout the several views, and in which.

Figure 1:
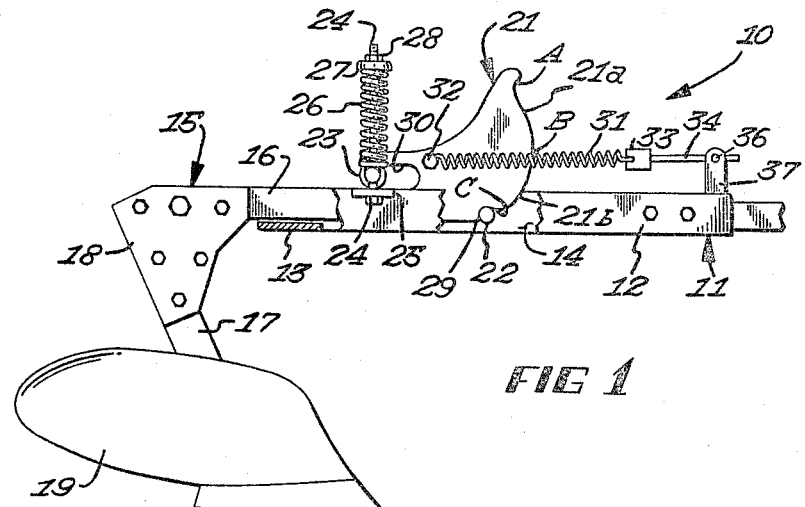
FIG. 1 is a side elevational view of a draft connection embodying the present invention, certain parts thereof broken away for clarity, and in which the agricultural implement illustrated comprises a plow.
Figure 2:
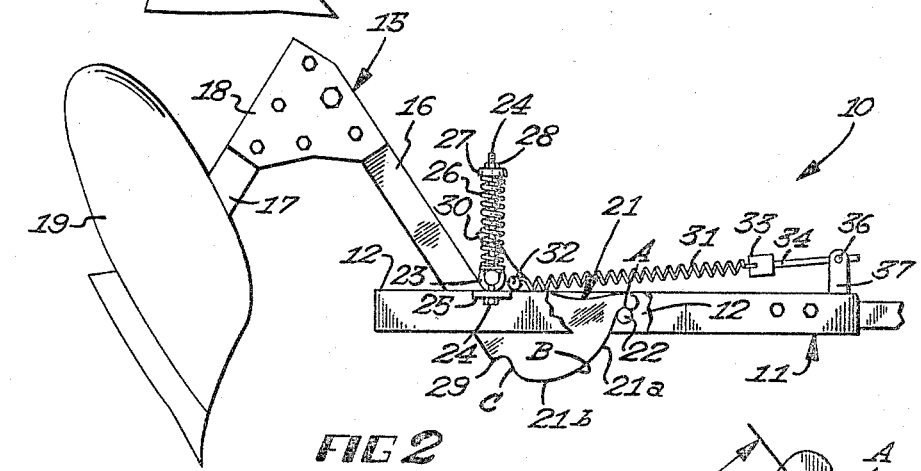
FIG. 2 is a side elevational view similar to FIG. 1 but illustrating the plow in an elevated position while traversing an obstruction.

Referring now to the drawings, it will be seen that one embodiment of my novel draft connection, designated generally by the reference numeral 10, is there shown. This draft connection 10 includes a main beam 11 which may be part of a gang frame formed of a plurality of such beams arranged in parallel relation and each of which carries an agricultural implement such as a plow share, the plows being arranged in echelon. The main beam is comprised of a pair of laterally spaced-apart elongate substantially flat side plates 12 which are bolted or otherwise secured together. A small elongate spacer and stop bar 13 is positioned between the rear portion of the side plates, the function of this bar 13 to be described more fully hereinbelow.

It will be seen that the side plates 12 define a slot 14 therebetween which accommodates therein the horizontal leg 16 of a yieldable beam 15. The yieldable beam 15 also includes an elongate shank 17 which is secured to the rear end of the leg 16 by means of suitable gusset plates 18. This shank 17 extends downwardly and forwardly from the leg 16 when the latter is in a horizontal position and is secured in a conventional manner to a plow bottom 19 which is of conventional construction. The leg 16, which is normally disposed in a substantially horizontal position when the plow bottom 19 is in the operative position, is limited in its movement in a downward direction from its normal horizontal position by the spacer and stop bar 13, although the leg 16 is disposed out of engagement with this spacer and stop bar when the beam is in the operative position. Thus the spacer and stop bar 13 serves to prevent downwardly swinging movement of the leg 16 beyond its normal horizontal operative position as illustrated in FIG. 1.

The horizontal leg 16 has a head or positioning plate 21 integrally formed with the forward end thereof and this plate 21 is of substantially flat construction. The yieldable beam 15 is supported for vertical swinging movement from the normal horizontal position as illustrated in FIG. 1 in response to a predetermined draft load. This draft load occurs when the plow bottom 19 strikes an obstruction. The two-point support of the yieldable beam 15 comprises a front fixed pivot or cam roller 22 and a rear movable pivot roller 23. The front cam roller is positioned between and revolvably mounted on the side plates 12 of the main beam 11 while the rear pivot roller 23 is also mounted on the main beam 11 but is capable of limited vertical translation relative to the beam.

The means for mounting the rear pivot roller comprises a pair of substantially identical elongate bolt members 24 each of which projects through an aperture in angle bracket 25 affixed to one of the side plates 12 and projecting laterally outwardly from the exterior surface thereof. Each of the bolt members has one of a pair of springs 26 disposed in encircling relation therewith, the upper ends of the springs bearing against a substantially flat horizontally disposed strap or plate 27 which is suitably apertured at opposite ends thereof and through which the bolt members 24 project. Suitable threaded retaining nuts engage the threaded upper ends of the bolt members 24 and serve to retain the strap 27 thereon. The bolt members 24 also project through suitable eye elements or apertures located in opposite ends of the axle for the rear pivot roller 23, and the lower ends of the springs 26 also engage the outer ends of the axle of the rear roller 23 to normally urge the same downwardly. It will therefore be seen that the rear pivot roller 23 is normally urged downwardly by the springs 26 and upward movement of this rear pivot roller will be against the bias of these springs.

The positioning plate or head 21 is provided with a rearwardly opening elongate slot or recess 30 therein which accommodates the rear pivot roller therein. The lower front end of the positioning plate 21 is provided with a stop or abutment surface 29 which is urged into bearing relation against the front pivot roller or cam 22 when the yieldable beam is in the operative horizontal position.

Since the yieldable beam 15 is capable of longitudinal movement as well as vertical swinging movement relative to the main beam, means are provided for yieldably resisting either rearward or swinging movement of the yieldable beam and for constantly urging this yieldable beam into its operative position. This means includes a pair of elongate helicoid springs 31 which are disposed on opposite sides of the positioning plate 21 and project forwardly therefrom. The springs 31 are inclined upwardly and forwardly from their point of attachment with respect to the positioning plate 21. To this end, it is pointed out that the positioning plate 21 is apertured to accommodate the bolt assembly 32 to which the respective rear ends of the springs 31 are secured. Thus it will be noted that the anchored rear ends of the springs 31 are transversely aligned with respect to each other and this point of connection is located slightly forwardly of and above the axis of the rear pivot roller 23.

The respective forward ends of the springs 31 engage the rearwardly extending legs of a U-shaped member 33, the bight portion of the U-shaped member 33 being provided with a threaded aperture for receiving the threaded end of an anchor bolt 34. The T-shaped tubular end (not shown) of the anchor bolt 34 is journaled upon a horizontally disposed transversely extending pivot 36 which is secured to the legs of a bracket 37 carried by the forward end of the main beam. Thus it will be seen that any rearward longitudinal sliding movement of the yieldable beam 15 will be against the bias of the springs 31. It will also be noted that when the yieldable beam 15 is in the horizontal operative position, the beam is supported solely by the front and rear pivot rollers. The rear springs 26 urge the yieldable beam downwardly against any component of vertical force while the springs 31 not only yieldably resist any longitudinal rearward sliding movement of the yieldable beam but also resist any swinging movement of the yieldable beam. Actually the springs 31 cooperate with the front cam roller 22 to exert a wedge effect on the yieldable beam during any displacement of the latter.

Figure 3:
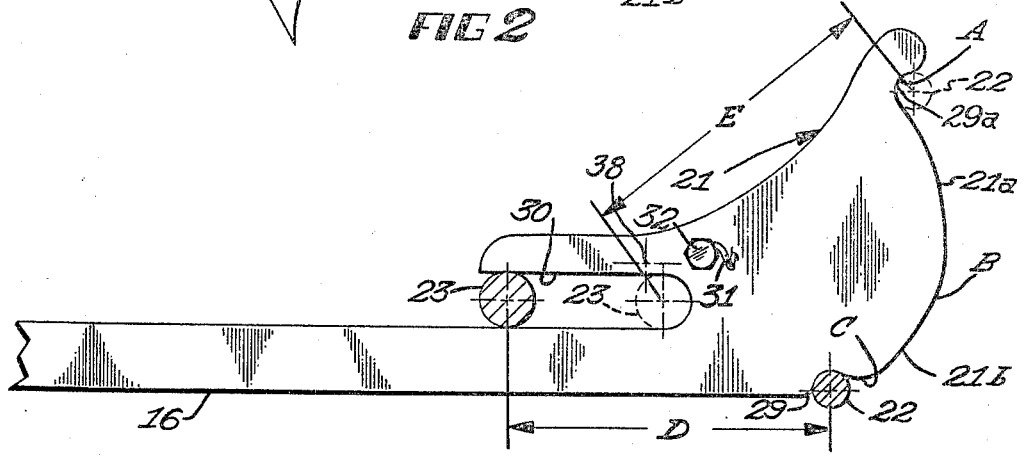
FIG. 3 is a side elevational view on an enlarged scale of the horizontal leg of the yieldable beam.

Referring now to FIG. 3 it will be seen that the forward edge surface of the positioning plate 21 defines a continuously curved camming surface. The particular configuration of the camming surface is one of the very important features of the present invention and to this end it will be seen that the camming surface actually includes two portions designated 21a and 21b. One arcuate portion 21a extends from a point A located adjacent the upper stop surface 29a to a point B. The other arcuate portion extends from point B to point C, the latter located adjacent the lower stop surface 29. The arcuate surface 21a is formed by a radius having its center located at a point slightly above and forwardly of the rear pivot roller 23. The curved portion 21b has a decreasing radius and constitutes an arc of an ellipse and actually constitutes two thirds of the total camming surface at the front edge of the positioning plate.

Referring again to FIG. 3, it will be seen that the longitudinal spacing of the front and rear rollers is constant throughout movement of the yieldable beam 15. Thus the springs 31 will be progressively tensioned when the yieldable beam 15 is displaced relative to the main beam. Actually during operation of the yieldable beam 15 when the plow bottom 19 strikes an obstruction, there is actually no horizontal component of movement prior to pivoting movement of the beam about the pivot roller 23. This is a clear distinction over the operation of the yieldable draft attachment illustrated in the Quanbeck Patent No. 3,052,308 of which the present invention is an improvement.

During the operation of the yieldable draft connection, the yieldable beam 15 is adapted to vertically yield when a predetermined draft load occurs and allows the plow share 19 to traverse or negotiate obstructions. It is pointed out that the force exerted by the springs 26 is less than the force exerted by the springs 31 thereby allowing the yieldable beam 15 to yield vertically slightly with the front pivot roller 22 serving as a fulcrum. However, when the plow share 19 engages an obstruction to produce a draft load which is sufficient to overcome the downward force exerted by the springs 26 and after the yieldable beam 15 has moved the vertically shiftable rear roller 23 to the limit of its vertical translation, the yieldable beam will then pivot about this rear roller. When this occurs the front continuous camming surface will be progressively moved over the cam roller 22. During this swinging movement of the yieldable beam 15, the springs 31 will be progressively tensioned. The specific manner in which these springs 31 are tensioned also constitutes an important feature of the present invention.

It is first pointed out that the springs 31 are progressively tensioned as the camming surface 21a–21b is moved over the camming roller 22 from adjacent the stop surface 29 to the stop surface 29a, as illustrated in FIG. 3. However, the greatest amount of tension or stretching of these springs occurs during the first portion of vertical swinging movement of the yieldable beam. As the camming surface 21a–21b is moved over the cam roller 22 so that the point B engages the camming roller, at least three fourths or 75% of the ultimate load produced by tensioning the springs 31 will have been produced at this point. The remaining load produced or stretching of the springs will be accomplished as the cam surface 21a is moved over the roller, so that during return of the yieldable beam to its horizontal position, the first one third of movement of the camming surface over the front camming roller 22 will result in a diminishing of the tension load exerted by the springs 31 of approximately 25%. Thereafter, the tension load quickly diminishes as the camming surface 21b is moved over the front camming roller 22.

The retention of the tension load exerted on the plow share 19 during the return thereof to its lowermost position is essential in order to permit the plow share to penetrate the soil as the latter approaches its lowermost position. One of the problems of the trip beams is that in all plows currently in use, the operator must either stop and back up or must stop and hydraulically elevate the gang plows out of the ground to allow the tripped plow bottom to reset to its operative position. However, the present arrangement permits the operator to continue operation of the tractor without interruption even though the yieldable beam 15 has been pivoted to permit the plow share associated therewith to be moved completely out of the soil during traversing movement with respect to an obstruction. The draft force exerted by forward movement of the plow share is overcome by the load exerted by the springs 31 and the total effect is the plow share will positively penetrate the soil and return to its lower operative position with a slightly cushioning effect produced by the oppositely acting draft force. The springs 26 tend to dampen upward movement of the yieldable beam 15 as the latter is swung upwardly in response to engagement of the plow share 19 with an obstruction.

The particular inclination of the springs 31 in upwardly and forward direction from their point of attachment with the positioning plate 21 is another essential feature of the invention. It is preferred that the inclination of the springs be approximately 15 degrees from the horizontal although the springs may be inclined within the range of 12–24 degrees from the horizontal. This particular arrangement along with the arrangement of the camming surface which includes the continuous elliptical and arcuate portions thereof produce a wedge effect with respect to the yieldable beam 15 as it is urged toward its lowered operative position. Thus any displacement of the yieldable beam 15 from its normal lowered horizontal position will be against the bias exerted by both the springs 31 and 26.

The springs 31 exert the primary return force on the beam and the manner in which this force is increased and diminished during yielding movement of the beam together with the direction of forces applied to the beam assures that the beam will always return to its operative lowered position regardless of soil conditions. To this end, it is pointed out that the springs 31 can be adjusted to compensate for varying conditions of the soil which is being plowed. Under heavy compacted soil conditions, the springs 31 will be preloaded to a greater degree than when the soil is not so compacted or dense.

Even though the load of the springs 31 is quickly diminished during return of the yieldable beam to its horizontal operative position, this force is dampened somewhat by the draft force exerted by the plow as it enters the soil and since the forward movement of the tractor is normally not interrupted.

It will therefore be seen that I have provided a novel yieldable draft connection especially adaptable for use with plow shares and which permits the plow shares to negotiate and traverse obstructions without damage to the latter.

It will also be seen that although the plow shares are supported by a yieldable beam, the beam is constantly urged to its operative position and does not therefore trip in the manner that conventional trip beams operate. It will further be seen that through the use of the uniquely constructed cam and camming surface on the main and yieldable beams of the draft connection, the major portion of the tension load exerted on the yieldable beam is quickly diminished during the terminal portion of the return movement of the yieldable beam to its operative position and thereby permits the plow share to penetrate the soil without necessitating stoppage of the prime mover by which the implements are being towed.

It will, of course, be understood that various changes may be made in the form, details, arrangement and proportions of the various parts without departing from the scope of my invention.

What is claimed is:

1. A draft attachment for plows and the like comprising
   a main beam,
   a yieldable beam mounted on said main beam and extending longitudinally thereof,
   means defining a pair of longitudinally spaced-apart front and rear pivots on said main beam supporting said yieldable beam for vertical swinging movement to a tilted position relative to said main beam from a normal horizontally disposed operating position and for return thereto,
   a positioning member on said yieldable beam having a rear slot therein receiving said rear pivot therein, said positioning member having a front edge defining an elongate continuous curved camming surface engaging said front pivot and extending upwardly thereabove when said yieldable beam is in the normal operating horizontal position, said camming surface including a lower portion which defines an arc of an ellipse, and an arcuate upper portion, said camming surface being movable over said front pivot during pivotal movement of said yieldable beam,
   and an elongate yieldable resilient member having one end connected to said positioning member and extending forwardly and upwardly therefrom in said tilted position and having its other end secured to said main beam and normally holding said camming surface of the positioning member against said front pivot, and yieldably resisting upward movement of said yieldable beam, the points of connection between said resilient member and said positioning member and the main beam being related to said cam engaging surface whereby upon upward swinging movement of the yieldable beam about said rear pivot said resilient member will be progressively tensioned.

2. A draft attachment for plows and the like comprising
   a main beam,
   a yieldable beam mounted on said main beam and extending longitudinally thereof in a fore-and-aft direction,
   a pair of longitudinally spaced-apart rollers on said main beam defining a front and rear pivot supporting said yieldable beam for vertical swinging movement to a tilted position relative to said main beam from a normal horizontally disposed operating position and for return thereto,
   a positioning member integrally formed with the front end portion of said yieldable beam and having a rearwardly facing slot therein receiving said rear pivot roller therein, said positioning member having a front edge defining an elongate continuous curved camming surface engaging said front pivot roller and extending upwardly therefrom when said yieldable beam is in the normal operating horizontal position, said camming surface including a lower portion which defines an arc of an ellipse, and an upper arcuate portion, said camming surface being movable over said front pivot roller during pivotal movement of said yieldable beam,
   and an elongate yieldable resilient member having one end thereof connected to said positioning member and extending forwardly and upwardly therefrom in said tilted position and having its other end secured to said main beam and yieldably holding said camming surface of the positioning member against said front pivot, said yieldable resilient member yieldably resisting upward movement of said yieldable beam during swinging movement of the latter about said rear pivot roller, the points of connection between said resilient member and said positioning member and main beam being related to said cam engaging surface whereby upon upward swinging movement of the yieldable beam about said rear pivot said resilient member will be progressively tensioned, as said camming surface is moved substantially throughout its length over said front pivot roller, the greatest magnitude of tensioning of said resilent member occurring as said lower portion of said camming surface is moved over said front pivot roller.

3. The draft attachment as defined in claim 2 wherein said elongate yieldable resilient member is inclined forwardly and upwardly at an angle of approximately 15 degrees with respect to a horizontal plane when said yieldable beam is in said tilted position.

4. The draft attachment as defined in claim 2 wherein said rear pivot roller is mounted on said main beam for limited vertical shifting movement relative thereto.

5. The draft attachment as defined in claim 2 wherein said elongate yieldable resilent member extends upwardly and forwardly at an angle within approximately 12 degrees to 24 degrees from the horizontal when said yieldable beam is in said tilted position.

6. A draft attachment as defined in claim 2 wherein said upper arcuate portion has a radius of curvature having its center located slightly above and forwardly of the rear pivot roller when said yieldable beam is in the horizontal operative position.

References Cited by the Examiner

UNITED STATES PATENTS 3,052,308  9/1962  Quanbeck _____ 172–264

ABRAHAM G. STONE, *Primary Examiner.*
ANTONIO F. GUIDA, *Examiner.*
J. R. OAKS, *Assistant Examiner.*